United States Patent
Matsumoto et al.

[11] Patent Number: 5,898,726
[45] Date of Patent: Apr. 27, 1999

[54] PREHEATER FOR ARC FURNACES

[75] Inventors: Hiroshige Matsumoto; Shinjiro Uchida; Keiichi Tanabe; Toshitaka Nakayama; Makoto Takahashi, all of Kitakyushu, Japan

[73] Assignee: Nippon Steel Corporation, Tokyo, Japan

[21] Appl. No.: 08/930,944

[22] PCT Filed: Apr. 11, 1996

[86] PCT No.: PCT/JP96/01003

§ 371 Date: Oct. 2, 1997

§ 102(e) Date: Oct. 2, 1997

[87] PCT Pub. No.: WO96/32616

PCT Pub. Date: Oct. 17, 1996

[30] Foreign Application Priority Data

Apr. 14, 1995 [JP] Japan ................................ 7-089359

[51] Int. Cl.⁶ ............................................. F27D 13/00
[52] U.S. Cl. ......................... 373/80; 373/78; 373/79; 373/84
[58] Field of Search .......................... 373/78–84

[56] References Cited

U.S. PATENT DOCUMENTS 4,736,383  4/1988  Meierling ................................ 373/78

FOREIGN PATENT DOCUMENTS

| 57-31068 | 7/1982 | Japan. |
| 58-10675 | 2/1983 | Japan. |
| 58-83100 | 6/1983 | Japan. |
| 61-36159 | 10/1986 | Japan. |
| 3-505625 | 12/1991 | Japan. |
| 4-309789 | 11/1992 | Japan. |
| 5-500263 | 1/1993 | Japan. |
| 7-332863 | 12/1995 | Japan. |

Primary Examiner—Tu Ba Hoang
Attorney, Agent, or Firm—Kenyon & Kenyon

[57] ABSTRACT

To provide a pre-heating apparatus capable of improving the installation reliability of a raw material holding gate of a pre-heating apparatus, reducing an installation cost and reducing melting electric power energy without deteriorating an operation environment while improving the pre-heating effect on raw materials by an exhaust gas, a shaft equipped with a raw material charging portion and an exhaust gas outlet at the top thereof and with a raw material holding gate at the bottom thereof is disposed in the proximity of an arc furnace, a gap is defined between the lower end portion of the shaft and the holding gate, and an outer cylinder connecting with an exhaust gas duct of the arc furnace is disposed around the outer periphery of the gap.

3 Claims, 4 Drawing Sheets

PREHEATER FOR ARC FURNACES

This application is a National Phase under 35 U.S.C. §371 of PCT/JP96/01003 filed Apr. 11, 1996.

TECHNICAL FIELD

This invention relates to a pre-heating apparatus for an arc furnace which is used for melting metallic material and for refining molten metals. Specifically, the invention relates to a pre-heating apparatus capable of preventing a non-uniform flow of an exhaust gas inside a shaft, relieving a thermal load on a gate for holding a raw material and reducing an installation cost.

BACKGROUND ART

Arc furnaces for refining include a D.C. arc furnace which causes a current to flow between an electrode disposed above metallic materials charged into the furnace and an electrode fitted to a furnace bottom or a furnace wall such as a side wall and which effects melting of the metallic materials and refines a molten metal, and an A.C. arc furnace which causes a current to flow through three electrodes disposed above the molten metal charged into the furnace, and effects melting of the metallic materials and refining of the molten metal. Exhaust gas utilization systems in the arc furnaces of these kinds generally have constructions wherein a pre-heating vessel is disposed between the arc furnace and dust collecting equipment, a bucket of the metallic materials is inserted into this pre-heating vessel and the metallic materials are pre-heated by an exhaust gas.

However, the exhaust gas duct between the arc furnace and the pre-heating vessel has a water-cooling structure because a high temperature gas generated by the arc furnace flows through this duct, and the temperature of the exhaust gas reaching the pre-heating vessel drops to an extent corresponding to the temperature drop due to water-cooling. Therefore, the retained heat of the exhaust gas cannot be efficiently utilized for pre-heating the metallic materials, and this is a critical problem from the aspect of heat efficiency. Further, the white smoke and the offensive odor that are generated when the pre-heated metallic materials are conveyed in the bucket to the arc furnace are also a critical problem from the aspect of the operating environment.

Therefore, various proposals have been made so far in order to efficiently utilize the heat of the exhaust gas for pre-heating the raw materials and to charge the pre-heated raw materials into the arc furnace without conveying them from the pre-heating vessel to the arc furnace. Japanese Unexamined Patent Publication (Kokai) No. 3-505625, for example, describes an arc furnace which pre-heats the raw materials in a pre-heating zone formed by a shaft disposed on a furnace cover and a part of a furnace body and lets the pre-heated raw materials, which are stored in the shaft, drop naturally.

In this case, however, after the raw materials stored in the shaft disposed on the furnace cover naturally drop and are then molten, or in other words, at the so-called "refining stage", the raw materials no longer exist inside the shaft, and are not pre-heated by the heat of the exhaust gas any more. Therefore, the problem of heat efficiency was still unsolved.

To solve this problem, Japanese Unexamined Patent Publication (Kokai) No. 5-500263, for example, proposes a method which disposes two sets of arc furnaces, introduces the exhaust gas into the other of the arc furnaces, which stores the raw materials inside the shaft and is in a stand-by state, so as to pre-heat the raw materials after the raw materials stored in one of the arc furnaces naturally drop and are molten by electric power supplied to this arc furnace, and pre-heats the raw materials by the other arc furnace so as to improve heat efficiency.

Japanese Unexamined Patent Publication (Kokai) No. 4-309789 proposes a method which forms the pre-heating zone in only the shaft, disposes a raw material holding gate inside the shaft, makes it possible to always store the raw materials inside the shaft and thus utilizes the heat of the exhaust gas at the refining stage.

By the way, a major portion of the energy for melting the metallic materials in the arc furnace is provided by electrical energy. When the energy efficiency for melting the metallic materials is taken into consideration, it is desirable to position the arc as the energy source as close as possible to the center portion of the furnace body, that is, to dispose the upper electrode to bring the charging portion of the metallic materials to be molten as close as possible to the center portion of the furnace body and to generate the arc from the upper electrode at the center of the metallic materials so as to uniformly melt them throughout the periphery.

This proposal exploits fully the great advantage of the D.C. arc furnace in that only one upper electrode is needed and the energy utilization efficiency is higher than the A.C. arc furnace which requires three upper electrodes. This advantage quite naturally holds true of the case where the metallic materials, as the object of melting, are pre-heated.

However, in the prior art proposals of Japanese Unexamined Patent Publications (Kokai) Nos. 3-505625, 5-500263 and 4-309789 described above, the shaft is disposed on the side wall portion of the furnace body and the pre-heated raw materials are therefore charged to only the side wall portion of the furnace body. In other words, the portion of the furnace body opposite to this side wall portion to which the raw materials are not charged is always heated uselessly by the arc heat and is not used for melting the raw materials, thereby inviting the drop of energy utilization efficiency. Since the raw materials are charged only to the portion of the furnace away from the upper electrode, the melting speed becomes lower than the case where melting is carried out by disposing the upper electrode above the center portion of the raw materials, and energy utilization efficiency drops.

To solve this problem, it may be conceivable to employ a method which charges the raw materials while the furnace cover and the shaft are moved so that the shaft comes to the center portion of the furnace body. In this case, the upper part of the furnace body is opened with the movement of the furnace cover in the furnace cover shape according to the prior art, and when the raw materials inside the shaft are charged into the furnace, a gas containing high temperature dust is blasted out from the upper portion of the furnace body and remarkably deteriorates the operation environment.

In an arc furnace wherein a shaft for pre-heating raw materials is disposed on a furnace cover, and this shaft and an upper electrode are positioned at the center of the furnace cover and capable of moving up and down are integrally disposed, Japanese Patent Application No. 6-144079 filed previously by the inventors of the present invention to solve the problem described above employs the construction wherein the furnace cover is movably constituted and the furnace cover covers the upper portion of the furnace body even at the time of movement.

DISCLOSURE OF THE INVENTION

Even in the improved system described above, there remains the following problem to be solved. The system which holds the raw materials inside the shaft disposed on the furnace cover and pre-heats them is an advantageous system from the aspect of heat recovery because it can directly utilize the high temperature exhaust gas from the arc furnace. However, the holding gate of the raw materials disposed inside the shaft receives the drop impact load at the time of charging of the raw materials into the shaft, and must pass the high temperature exhaust gas from the arc furnace while receiving the load of the raw materials during pre-heating.

Therefore, openings for gas passage such as slit-like grooves are necessary, and since the entire surface of the holding gate exposed inside the shaft is exposed to the high temperature exhaust gas, it must have various performance features such as extremely high strength, heat-resistance and high wear resistance in combination. Accordingly, problems are yet left in the aspects of reliability of equipment and the installation cost.

To cope with this problem, it may be possible to employ a method which disposes the shaft in the proximity of the arc furnace, disposes the raw material charging portion and an exhaust gas outlet at the top of the shaft and the raw material holding gate capable of being sealed to the bottom of the shaft, introduces the exhaust gas from the arc furnace to the side wall portion of the shaft through an exhaust gas duct to thereby eliminate the necessity for the passage of the exhaust gas through the raw material holding gate portion, and thus reduces the thermal load to the holding gate. In this case, however, because the introduction direction of the exhaust gas into the shaft becomes unidirectional, it happens that a non-uniform flow of the gas occurs inside the shaft, the drop in pre-heating efficiency occurs.

It is therefore an object of the present invention to provide a pre-heating apparatus of an arc furnace capable of improving equipment reliability of a raw material holding gate, reducing an installation cost, and reducing electric power energy requirements for melting the pre-heated raw materials while improving pre-heating efficiency of the raw materials by an exhaust gas but without deteriorating an operation environment.

The present invention provides a pre-heating apparatus of an arc furnace which includes a shaft disposed in the proximity to an arc furnace having an exhaust gas duct for exhausting a furnace gas on a furnace body or a furnace cover, and having a raw material charging portion and an exhaust gas outlet at the top thereof and a holding gate for holding the raw materials charged at the bottom thereof, and which pre-heats the raw materials charged into the shaft by an exhaust gas generated by the arc furnace so as to effectively utilize retention heat of the exhaust gas.

The gists of the pre-heating apparatus of an arc furnace according to the present invention reside in the following points.

(1) A pre-heating apparatus for an arc furnace characterized in that a shaft is provided to a furnace body or a furnace cover in the proximity of an arc furnace having an exhaust gas duct for exhausting a furnace gas, a raw material charging portion and an exhaust gas outlet are disposed at the top of the shaft, a holding gate is disposed in such a manner as to keep a predetermined gap with the lower end portion of a side wall of the shaft, an outer cylinder connecting with an exhaust gas duct from the arc furnace through a connecting duct is disposed round the lower portion of the side wall of the shaft, and a moving device capable of moving in a horizontal direction is disposed so as to set the furnace body or the shaft at a predetermined operating position.

(2) A pre-heating apparatus of an arc furnace according to item (1), wherein a hood is disposed at a lower portion of the shaft, and the hood is capable of covering an opening of the upper surface of the furnace body when raw materials are charged into the furnace.

(3) A pre-heating apparatus of an arc furnace according to item (1), wherein dust collecting ducts capable of communicating with the exhaust gas outlet at the top of the shaft are disposed at the position at which the raw materials are pre-heated inside the shaft and at the position at which the raw materials are charged into the furnace, respectively, in the positional relationship between the furnace body of the arc furnace and the shaft.

(4) A pre-heating apparatus for an arc furnace according to item (1), wherein the furnace cover and an upper electrode are allowed to move in a horizontal direction while keeping a predetermined positional relationship with the shaft when the furnace body or the shaft is moved in the horizontal direction.

(5) A pre-heating apparatus for an arc furnace according to item (4), wherein a driving device is provided so as to move the upper electrode and an elevating device for the electrode in the horizontal direction, detectors for detecting displacement such as extension and contraction are provided to driving devices for tilting the furnace body of the arc furnace and for moving the upper electrode in the horizontal direction, respectively, and a computer is further disposed so as to calculate displacement of an upper electrode through-hole disposed in the furnace cover from the displacement of the driving device for tilting the furnace body of the arc furnace and to calculate further the displacement of the driving device for moving the upper electrode in the horizontal direction on the basis of the displacement of the upper electrode through-hole.

BEST MODE FOR CARRYING OUT THE INVENTION

Figure 1:
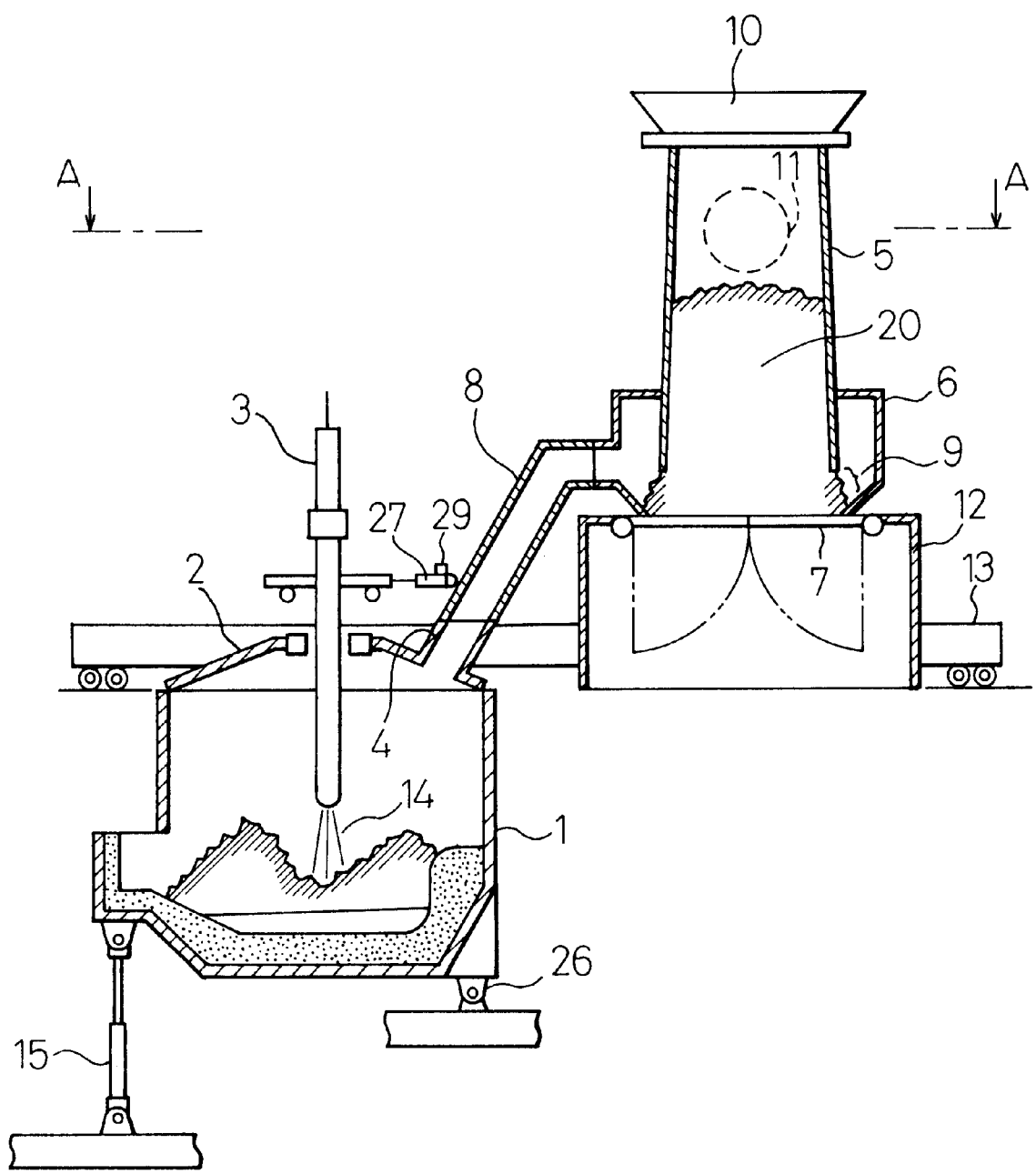
FIG. 1 is an overall longitudinal sectional view of an arc furnace and a pre-heating apparatus in an embodiment according to the present invention.

The exhaust gas duct for exhausting the furnace gas is disposed on the furnace body or the furnace cover of the arc furnace and is connected through the connecting duct to the lower portion of the shaft equipped with the raw material charging portion and the exhaust gas outlet at the top thereof and the holding gate for holding the charged raw materials at the bottom thereof.

In other words, in the pre-heating apparatus of the arc furnace of the type wherein the exhaust gas generated in the arc furnace is introduced through the exhaust gas duct and the connecting duct into the shaft so as to pre-heat the raw materials charged into the shaft and the furnace body or the shaft is allowed to move in the horizontal direction so as to charge the pre-heated raw materials into the furnace body by opening the holding gate, the shaft is shaped in such a manner that the lower end portion of its side wall defines a gap with the holding gate, the outer cylinder for preventing intrusion of external air is disposed round the lower portion of the side wall, the connecting duct for introducing the exhaust gas generated in the arc furnace is connected to this outer cylinder, and the exhaust gas is introduced into the shaft through the gap between the outer cylinder and the side wall of the shaft.

Accordingly, the gap between the outer cylinder and the shaft side wall has the function of a header pipe, and the exhaust gas introduced from the arc furnace is uniformly distributed in the peripheral direction at the gap portion between the shaft side wall lower portion and the outer cylinder, and the exhaust gas introduced into the shaft is also made uniform in the peripheral direction and is allowed to flow. Since a non-uniform flow of the exhaust gas is thus eliminated inside the shaft, the pre-heating efficiency of the raw materials can be improved, and effective utilization of the retained heat of the exhaust gas can be accomplished.

Further, the exhaust gas of the arc furnace is introduced from above the raw material holding gate disposed at the bottom of the shaft, rises inside the shaft and is exhausted from the exhaust gas outlet disposed at the top of the shaft. Therefore, the passage of the exhaust gas in the vertical direction while the raw material holding gate is interposed does not occur, and it is only the upper surface side of the raw material holding gate that is affected by the high temperature exhaust gas, while the lower surface side is in contact with the atmosphere. In consequence, the countermeasure structure for the holding gate with respect to heat resistance becomes extremely simple, and an improvement in equipment reliability and a reduction of the equipment cost can be accomplished.

Further, the hood for covering the opening of the upper surface of the furnace body is disposed at the lower portion of the shaft at which the raw materials are charged into the furnace, and the dust collecting duct capable of communicating with the exhaust gas outlet at the top of the shaft is disposed at that position so as to remove the exhaust gas. Accordingly, when the holding gate is opened so as to charge the raw materials into the furnace, the hood collects the high temperature gas containing large quantities of dust generated from the furnace. Thereafter, the exhaust gas passes through the shaft and is removed from the exhaust gas outlet at the top of the shaft. In this way, the resulting gas from the arc furnace at the time of charging of the raw materials can be efficiently collected.

Because the furnace or the shaft can move in the horizontal direction, the upper electrode can be situated at the center of the furnace body during the melting operation of the arc furnace, and the raw materials can be charged to the center portion of the furnace body when they are charged into the furnace. Therefore, the energy utilization efficiency of the arc can be improved.

In the melting and refining operation by the arc furnace, there is the case where the furnace body is tilted while the furnace cover is put on the furnace body and power is applied. In this case, in the system where the upper electrode moves in the horizontal direction while keeping a predetermined positional relationship with the shaft, there may be the method which enlarges the electrode through-hole to match the tilting range of the furnace body. In this case, however, the intrusion quantity of external air through this electrode through-hole increases, and a drop in the heat efficiency of the arc furnace undesirably develops.

Therefore, the driving device for moving the upper electrode and the elevation device of the electrode in the horizontal direction is disposed and furthermore, the displacement detectors for the driving device for tilting the furnace body of the arc furnace and the driving device for the upper electrode in the horizontal direction are disposed, respectively. A computer is further disposed for these displacement detectors.

When the furnace body is tilted while the furnace cover is put on the furnace body, the displacement quantity of the driving device for tilting the furnace body such as extension and contraction of a hydraulic cylinder is detected, the displacement quantity of the upper electrode through-hole disposed in the furnace cover is computed on the basis of the displacement quantity so detected, and the upper electrode is moved in the horizontal direction in such a manner as to follow up the displacement quantity. In this way, enlargement of the electrode through-hole can be prevented, intrusion of external air into the furnace can be reduced, and the drop of heat efficiency of the arc furnace can be prevented.

Next, the embodiment of the invention will be explained with reference to the attached drawings.

EXAMPLE

Figure 2:
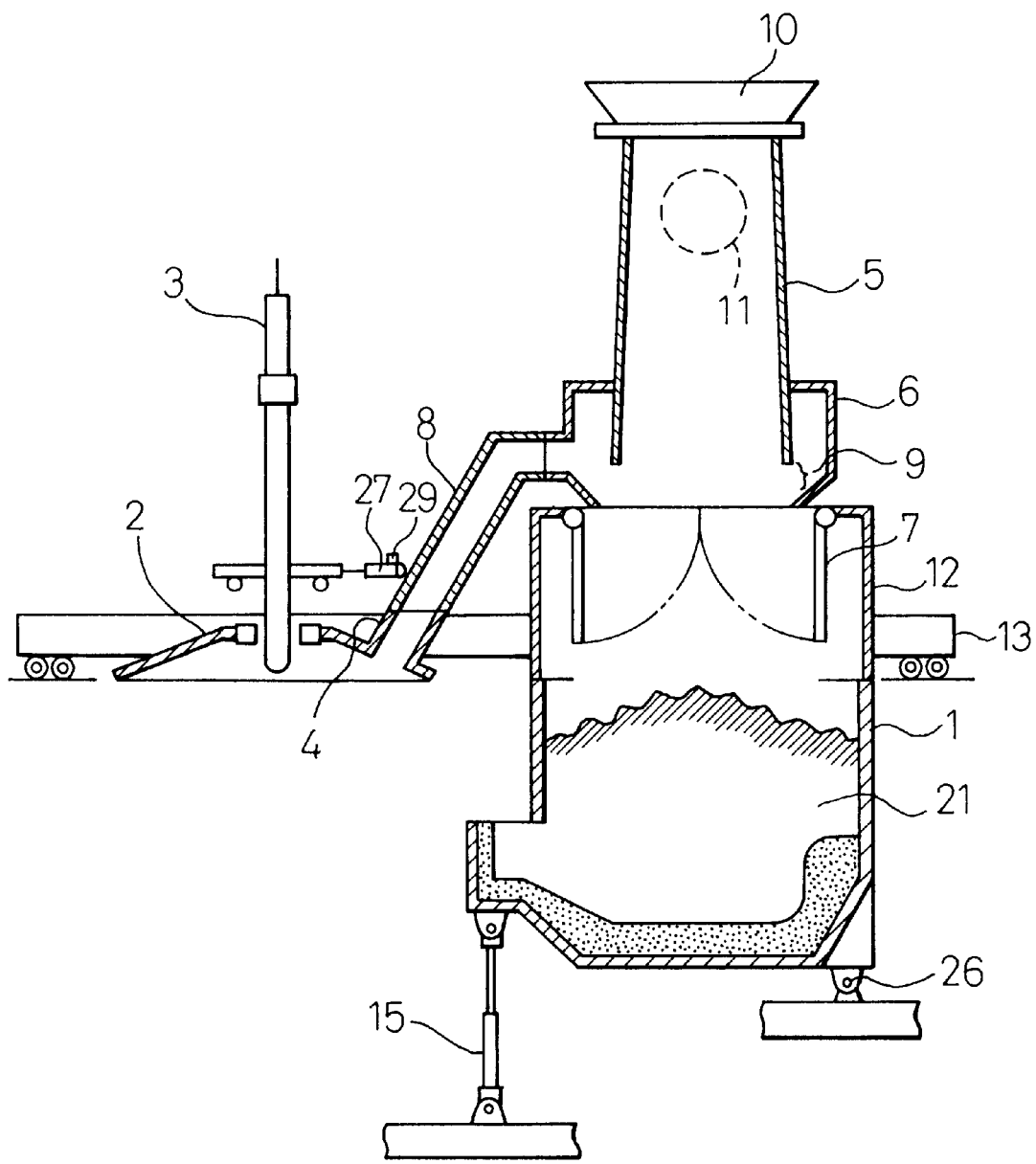
FIG. 2 is an overall longitudinal sectional view when raw materials inside the pre-heating apparatus of the arc furnace are charged into the furnace in an embodiment according to the present invention.
Figure 3:
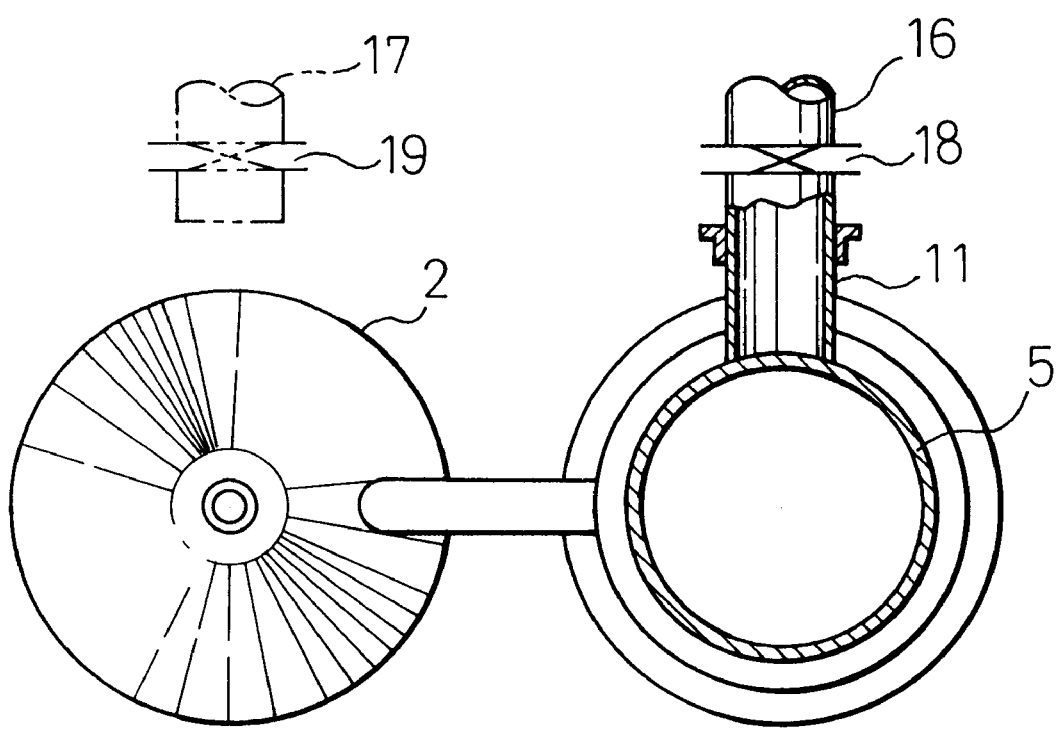
FIG. 3 is a view taken on a line A—A of FIG. 1.
Figure 4:
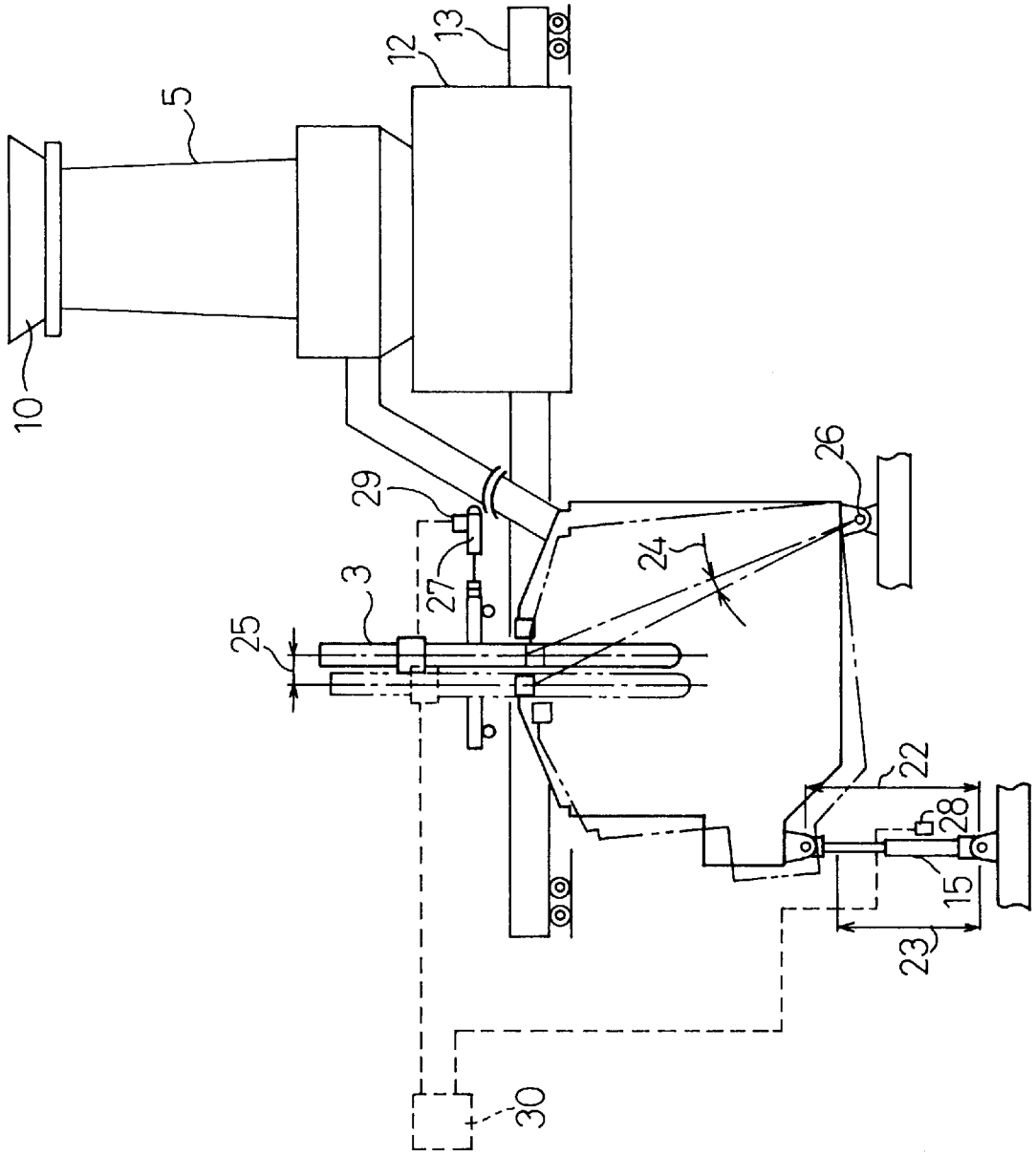
FIG. 4 is an explanatory view representing the positional relationship between a furnace cover and an upper electrode when a furnace body is tilted during the operation of the arc furnace in the embodiment according to the present invention.

FIG. 1 is an overall longitudinal sectional view of an arc furnace according to the present invention, and FIG. 2 is an overall longitudinal sectional view when raw material inside a shaft of the arc furnace according to the present invention are charged into the furnace. FIG. 3 is a view taken on a line A—A in FIG. 1, and FIG. 4 is an explanatory view showing the positional relationship between a furnace cover and an upper electrode when a furnace body is tilted during the operation of the arc furnace.

A furnace cover 2 having an exhaust duct 4 for exhausting a furnace gas is disposed at the upper part of a furnace body 1, and an upper electrode 3 is so disposed as to penetrate through the furnace cover 2. A driving device 15 is provided to the furnace body 1 so that the furnace body can be tilted, whenever necessary, during the melting operation.

A shaft 5 is disposed in the proximity of the furnace body 1. A raw material charging portion 10 and an exhaust gas outlet 11 are disposed at the top of this shaft 5 while a gate 7 for holding the raw material 20 charged into the shaft is disposed at the bottom portion.

Dust collecting ducts 16 and 17 are disposed at the position at which the raw materials 20 are pre-heated inside the shaft 5 and at the position at which the raw materials 20 are charged into the furnace, respectively. Dampers 18 and 19 are provided to these dust collecting ducts 16 and 17, respectively, and these dust collecting ducts 16 and 17 are further communicated with dust collecting equipment (not shown in the drawing).

The sectional shape 5 of the shaft 5 may be either circular or square, and the shaft 5 is preferably tapered downward so as to prevent clogging of the raw materials 20 inside the shaft 5.

A predetermined gap 9 is defined between the lower end portion of the shaft 5 and the holding gate 7, and is preferably disposed around the entire periphery of the lower end portion of the shaft. Further, an outer cylinder 6 connected to the exhaust gas duct 4 described above through a connecting duct 8 is disposed around the outer periphery of the shaft.

A hood 12 is disposed at the lower portion of the shaft 5 in such a manner as to cover an opening of the upper surface of the furnace body 1 when the raw materials 20 are charged into the furnace body 1, and this hood 12 is so shaped as to accommodate therein the raw material holding gate 7.

Moreover, in the embodiment, the furnace cover 2, the upper electrode 3 and the shaft 5 are supported by a moving device 13 so that the furnace cover 2 and the upper electrode 3 can move in the horizontal direction while keeping the positional relationship with the shaft 5 in a predetermined relationship.

Moreover, as another embodiment, the furnace cover 2 and the upper electrode 3 may be moved by a different driving system, e.g. a driving device for turning, and the shaft 5 may be supported by the moving device 13 so that the shaft 5 can move in the horizontal direction.

The operation of the apparatus having the construction described above will be explained in further detail.

A high temperature exhaust gas generated from the furnace body 1 during the melting operation is guided into the outer cylinder 6 disposed at the lower portion of the shaft 5 through the exhaust gas duct 4 and the connecting duct 8. The exhaust gas is then guided into the shaft 5 through the gap 9 between the lower portion of the shaft 5 and the holding gate 7.

In this instance, since the gap 9 is formed throughout the entire periphery of the lower portion of the shaft 5, gas is introduced uniformly into the shaft 5 in the circumferential direction, and a non-uniform flow of the gas can be eliminated inside the shaft 5. Therefore, the raw materials 20 inside the shaft can be efficiently pre-heated. Because the high temperature exhaust gas flows only on the upper surface side of the holding gate 7 disposed at the bottom of the shaft 5 in this case, the thermal load to the holding gate 7 is small and the reliability of the equipment can be drastically improved.

The gas after pre-heating is exhausted through the exhaust gas outlet 11 disposed at the top of the shaft, is introduced into the dust collecting equipment, not shown, and is thereafter exhausted into air.

When the raw materials are changed into the furnace, the furnace cover 2 and the upper electrode 3 are moved up, and the furnace cover 2, the upper electrode 3 and the shaft 5 are moved, integrally with one another, by the moving device 13. After the shaft 5 stops at the central position of the furnace body 1, the holding gate 7 is opened and the raw materials 20 are charged into the furnace.

The raw materials 21 so charged into the furnace are distributed into a mountain shape having the top thereof at the center of the shaft on the transverse sectional plane. In this instance, the opening on the upper surface of the furnace body 1 is covered by the hood 12 and furthermore, the exhaust gas outlet 11 at the top of the shaft 5 is connected to the dust collecting duct 17. Therefore, the high temperature exhaust gas, which is generated at the time of charging of the raw materials and contains large quantities of dust, can be efficiently collected by opening the damper 19 disposed on the dust collecting duct 17, and deterioration of the operation environment can be prevented.

After the raw materials are charged into the furnace, the moving device 13 moves to the pre-heating position of the raw materials 20 inside the shaft, the upper electrode 3 is lowered and generates an arc at the center portion of the raw materials and melting starts.

As can be clearly understood from the explanation given above, the position of the upper electrode most preferred from the aspect of melting efficiency and the charging position of the raw materials, or more concretely, the position of the upper electrode 3 and the charging position of the raw materials 20, can be situated at the center of the furnace body 1.

Next, the explanation will be given on a horizontal movement control mechanism of the upper electrode when the furnace body 1 is tilted while the furnace cover 2 is placed on the furnace body 1.

The furnace body 1 includes a driving device 15 for tilting and tilts with the center of tilting 26 as the center. The upper electrode 3 and an elevating device (not shown) of this electrode include a driving device 27 for horizontal movement, and each of these driving devices includes a displacement detector 28, 29.

An encoder, or the like, can be used for these detectors. Further, a computer 30 for an arithmetic operation of the displacement is provided. Next, the method of using these means will be explained.

The length displacement quantity between the displacement reference length 22 of the driving device 15 for tilting at the erect position of the furnace body 1 and the displacement length 23 of the driving device 15 at the tilted position of the furnace body 1, the relationship between this length displacement quantity and the tilted displacement angle 24 of the furnace body, and the relationship between the tilted displacement angle 24 and the length displacement quantity 25 of the upper electrode through-hole in the horizontal direction are determined by their dimensions, respectively, and these relational formulas are stored in advance in the computer 30.

The computer calculates the central position of the upper electrode through-hole of the furnace cover 2 by using the displacement detection value of the driving device 15 for tilting, and controls the driving device 27 for horizontal movement so that the center of the upper electrode is coincident with the central position so calculated. In this way, mechanical interference between the upper electrode 3 and the upper electrode through-hole of the furnace cover 2 can be prevented. Furthermore, because the open area of the electrode through-hole can be kept small, the intrusion of external air into the furnace can be reduced to minimum.

The explanation given above represents the case where the shaft 5 disposed in the proximity of the arc furnace is moved in the horizontal direction, but the present invention can be of course applied similarly to the system where the furnace body is moved in the horizontal direction.

INDUSTRIAL APPLICABILITY

As explained above, according to the pre-heating apparatus for the arc furnace of the present invention, the thermal load on the gate for holding the raw materials can be reduced. Therefore, the equipment reliability of the holding gate can be drastically improved, and the installation cost of the holding gate can be reduced.

Because the header space and the predetermined gap are secured at the lower portion of the shaft and because the exhaust gas of the arc furnace can be thus introduced uniformly into the shaft, a non-uniform flow of the gas can be restricted, and the pre-heating efficiency of the raw materials by the exhaust gas can be improved. Because the upper electrode and the raw material charging position can be positioned at the center of the furnace body, melting efficiency can be improved.

Because the exhaust gas generated at the time of charging of the raw materials into the furnace can be efficiently collected, the operation environment can be drastically improved. Because the size of the upper electrode through-hole of the furnace cover can be reduced to minimum, the intrusion quantity of external air into the furnace can be restricted to minimum and the drop of heat efficiency of the arc furnace can be prevented.

As described above, the present invention can make a great contribution in improving productivity by an improvement in melting efficiency, reducing melting energy, improving equipment reliability, reducing the installation cost, improving the operation environment, and the like.

We claim:

1. A pre-heating apparatus for an arc furnace characterized in that a shaft is provided in proximity to a furnace body and a furnace cover of an arc furnace having an exhaust gas duct for exhausting a furnace gas, a material charging port and an exhaust gas outlet are disposed at the top of said shaft, a holding gate is disposed in such a manner as to keep a predetermined gap with the lower end portion of a side wall of said shaft, an outer cylinder connecting with said exhaust gas duct from said arc furnace through a connecting duct is disposed around the gap and the lower end portion of the side wall of said shaft, a moving device capable of moving in a horizontal direction is disposed so as to set said shaft at a predetermined operating position, and further a hood is disposed at a lower portion of said shaft, and said hood is capable of covering an opening of the upper surface of said furnace body when raw materials are charged into the furnace, and further dust collecting ducts capable of communicating with said exhaust gas outlet at the top of said shaft are disposed at the position at which said raw materials are pre-heated in side said shaft and at the position at which said raw materials are charged into said furnace in the positional relationship between said furnace body of said arc furnace and said shaft.

2. A pre-heating apparatus for an arc furnace according to claim 1, wherein said furnace cover and an upper electrode are allowed to move in a horizontal direction while keeping a predetermined positional relationship with said shaft when said shaft is moved in the horizontal direction.

3. A pre-heating apparatus for an arc furnace according to claim 2 further comprising:

a horizontal driving device for moving said upper electrode in the horizontal direction, said upper electrode being disposed in a through-hole located in said furnace cover;

an elevating device for elevating said electrode;

a tilting device for tilting said furnace body of said arc furnace;

a first detector device for detecting horizontal movement of said electrode and providing a responsive signal;

a second detector device for detecting tilting of said furnace body and providing a responsive signal;

a computer for receiving said responsive signal from said first detector device and said second detector device and controlling said horizontal driving device.

* * * * *